(12) United States Patent
Happel

(10) Patent No.: US 8,083,937 B2
(45) Date of Patent: Dec. 27, 2011

(54) FLOATING BAFFLE PANEL AND FILTER APPARATUS

(76) Inventor: Thomas H. Happel, Cocoa, FL (US)

(*) Notice: Subject to any disclaimer, the term of this patent is extended or adjusted under 35 U.S.C. 154(b) by 224 days.

(21) Appl. No.: 12/592,805

(22) Filed: Dec. 4, 2009

(65) Prior Publication Data

US 2010/0078370 A1     Apr. 1, 2010

Related U.S. Application Data

(63) Continuation-in-part of application No. 12/587,574, filed on Oct. 13, 2009, which is a continuation-in-part of application No. 12/387,583, filed on May 6, 2009, which is a continuation-in-part of application No. 12/315,820, filed on Dec. 8, 2008, now Pat. No. 7,846,327.

(60) Provisional application No. 61/009,086, filed on Dec. 27, 2007.

(51) Int. Cl.
*E03F 5/14* (2006.01)

(52) U.S. Cl. ... 210/122; 210/155; 210/162; 210/170.03; 210/305; 210/538

(58) Field of Classification Search ............... 210/121, 210/122, 155, 156, 162, 170.03, 242.1, 299, 210/305, 521, 532.1, 538
See application file for complete search history.

(56) References Cited

U.S. PATENT DOCUMENTS

| | | | |
|---|---|---|---|
| 5,378,376 A * | 1/1995 | Zenner | 210/122 |
| 6,183,633 B1 * | 2/2001 | Phillips | 210/170.03 |
| 6,478,954 B1 * | 11/2002 | Turner et al. | 210/162 |
| 6,719,912 B2 * | 4/2004 | Seidl | 210/162 |
| 6,797,161 B2 * | 9/2004 | Use et al. | 210/305 |
| 6,869,525 B1 | 3/2005 | Happel | |
| 7,153,417 B2 * | 12/2006 | Happel | 210/162 |
| 7,291,262 B2 * | 11/2007 | Matsui et al. | 210/170.03 |
| 7,294,256 B2 | 11/2007 | Happel et al. | |
| 7,846,327 B2 * | 12/2010 | Happel et al. | 210/155 |
| 2010/0032363 A1 * | 2/2010 | Happel | 210/242.1 |
| 2010/0230338 A1 * | 9/2010 | Happel | 210/170.03 |
| 2011/0168612 A1 * | 7/2011 | Happel | 210/122 |

* cited by examiner

*Primary Examiner* — Christopher Upton
(74) *Attorney, Agent, or Firm* — William M. Hobby, III

(57) ABSTRACT

The present invention is a storm water filter system for filtering floatable debris and non-floating pollutants from storm water passing through a storm water drain system vault. The storm water filtering system has a vault having chamber having a wall between the inlet thereto and the outlet therefrom. The wall has a filter passageway therethrough for filtering the storm water and a floatable baffle panel covering a second passageway therethrough for capturing floatable debris and trash from the storm water. Storm water entering the vault inlet passes through a filter element and out the outlet and also can pass under the floating baffle panel when the floatable baffle panel is floated to a raised position to thereby prevent storm water from accumulating on the inlet side of the wall.

13 Claims, 4 Drawing Sheets

FLOATING BAFFLE PANEL AND FILTER APPARATUS

CROSS REFERENCES TO RELATED APPLICATIONS

This patent application is a continuation-in-part application of my pending U.S. patent application Ser. No. 12/587,574, filed Oct. 13, 2009 for a Floating Skimmer with Up-Flow Filter; which is Continuation-in-part of my pending U.S. patent application Ser. No. 12/387,583, filed May 6, 2009 for a Storm Water Filter System Having a Floating Skimmer Apparatus; which is a continuation-in-part of my U.S. patent application Ser. No. 12/315,820, filed Dec. 8, 2008 for a Storm Water Filter System Having a Floating Skimmer Apparatus, now U.S. Pat. No. 7,846,327; which is based on my U.S. Provisional patent application Ser. No. 61/009,086, filed Dec. 27, 2007 for a Floating Skimmer Apparatus.

BACKGROUND OF THE INVENTION

The present invention is a storm water filter system for filtering floatable debris and non-floating pollutants from storm water passing through a storm water drain system and more specifically, the present invention is directed towards a storm water filtering system having a floatable baffle panel therein for capturing floatable debris and trash from the storm water and separate filtration of non-floatable pollutants from water passing therethrough. The floatable baffle panel is able to rise to block floatable debris and to allow water to flow unrestricted therebeneath during large rain events.

Federal clean water requirements require that water bodies such as lakes and rivers meet strict minimal water quality specifications. To achieve this end, storm water drainage pipes often require treatment before conveying storm water into receiving water bodies. As a result, a wide variety of technologies have been developed to treat storm water and improve the water quality.

A common variety of storm water treatment systems are hydrodynamic separators such as baffle boxes and vortex systems. Hydrodynamic separators can treat relatively large water flows and are good for removing solids that are relatively large in size. Hydrodynamic separators do very little to remove the dissolved pollutants and have a typically poor removal efficiency for fine particles.

To achieve water treatment beyond what can be accomplished by a hydrodynamic separator, another class of storm water treatment systems commonly referred to as filtration systems are used. Filtration systems typically will pass the water flow through a filter media such as sand, zeolite, activated carbon, and the like. Filter media is typically selected to do more than remove solids from the water flow. Depending on the pollutants of concern, filter media can be selected to remove specific dissolved pollutants such as nutrients, metals, or a wide variety of chemical contaminates. However, a problem with using filter media in a storm water treatment system is the significant influence of friction between the water and the media. In addition, changing the direction of water flow as it passes through a filtration system reduces the kinetic energy of the water flow which will reduce the volume water flow. During big rain events a storm water filtration system in a storm water pipe can significantly inhibit the passage of water and cause flooding upstream from the filtration system. If the filtration system becomes clogged with debris the water flow can be completely stopped.

The purpose of the present invention is to be able to treat the storm water flow with a storm water filtration system that is resistant to clogging, yet be able to pass large water flows during large rain events. In this way filter media can be incorporated into the treatment of storm water without the potential of flooding upstream caused by the filtration system. The invention can be described as a vault that contains a wall having a passageway having a filter with a filter media therein for the passage of water therethrough and floating skimmer system which opens therebeneath when the floatable filter for blocking debris from passing through the vault. During times of high flow rates the floating skimmer rises with the water level in the vault and allows water to flow unrestricted thereunder. The skimmer system portion and the filter system of the invention are both positioned in line with the water flow. Once the water flow has passed through the filter or under the floatable filter panel, it will continue down stream. During large rain events that cause the water levels within the vault to rise, the floating baffle panel rises and allow water to flow thereunder and by-pass the filter.

The invention has three primary components that work in concert with each other. The filter passes the storm water therethrough during normal water level conditions while the floating baffle panel blocks floatable debris from passing through the vault and acts to direct the water flow through the filter during low to medium flow rates. During large flow rates the floating baffle panel reacts to allow the high flow rates to pass unrestricted therebeneath with minimal friction.

In the present invention a relative short floating baffle panel is used and has the same performance of a much taller fixed panel without the head loss associated with a taller baffle panel by opening up a larger passageway under the panel. A storm water treatment structure that makes use of a floating skimmer panel can be more easily retrofitted to an existing water shed storm drain system due to the minimal head loss of the shorter skimmer.

In my prior U.S. Pat. No. 6,869,525 for a Storm Drain Filter System I show a storm drain filter system which includes a skimmer for collecting floating hydrocarbons and for absorbing the hydrocarbons in a hydrocarbon absorbing boom while preventing them from passing out of the skimmer. In my prior U.S. Pat. No. 7,294,256 for a Storm Water Filter System, a storm water filter system is provided for filtering storm water being fed into an in-ground well and uses a fixed skimmer to prevent floating organic debris from entering the discharge into the in-ground recharge well.

SUMMARY OF THE INVENTION

The present invention is a storm water filter system for filtering floatable debris and non-floating pollutants from storm water passing through a storm water drain system vault. The storm water filtering system has a vault having chamber having a wall between the inlet thereto and the outlet therefrom. The wall has a filter passageway therethrough for filtering the storm water and a floatable baffle panel covering a second passageway therethrough for capturing floatable debris and trash from the storm water. Storm water entering the vault inlet passes through a filter element and out the outlet and also can pass under the floating baffle panel when the floatable baffle panel is floated to a raised position to thereby prevent storm water from accumulating on the inlet side of the wall.

The storm water filter system has a vault housing having a chamber therein having an inlet thereinto and an outlet therefrom and a wall mounted therein between the inlet and the outlet. The wall has a filter opening therethrough and a filter element removably mounted therein for filtering storm water passing therethrough. A pair of tracks are attached to the wall and define a passageway therethrough for movably supporting a floating baffle panel therein. The baffle panel is positioned to block floatable debris from passing thereover while forming a passageway thereunder and through the wall when the floating baffle panel is floated to a raised position. A floatation member is mounted on the floatable baffle panel on the vault inlet side of the wall to allow the baffle panel to rise and fall in the tracks with the rise and fall of storm water on the inlet side of the wall from a rest position to a raised position opening a passageway therebeneath as the water level rises in the vault chamber. The filter opening has a pair of tracks on two sides thereof for said filter to slide into and out of for filter replacement. The floatable baffle panel has a pair of seals on the sides thereof aligned to seal the floating baffle panel against the pair of tracks. The floatable baffle panel has a plurality of rollers, including load rollers and alignment rollers, on each side thereof riding in each side to the pair of tracks. The filter element may have plural filter media therein including a hydrocarbon absorbing media. Advantageously, the filter is located directly beneath openings in the vault to allow the filter element to be changed without personnel having to enter the vault.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
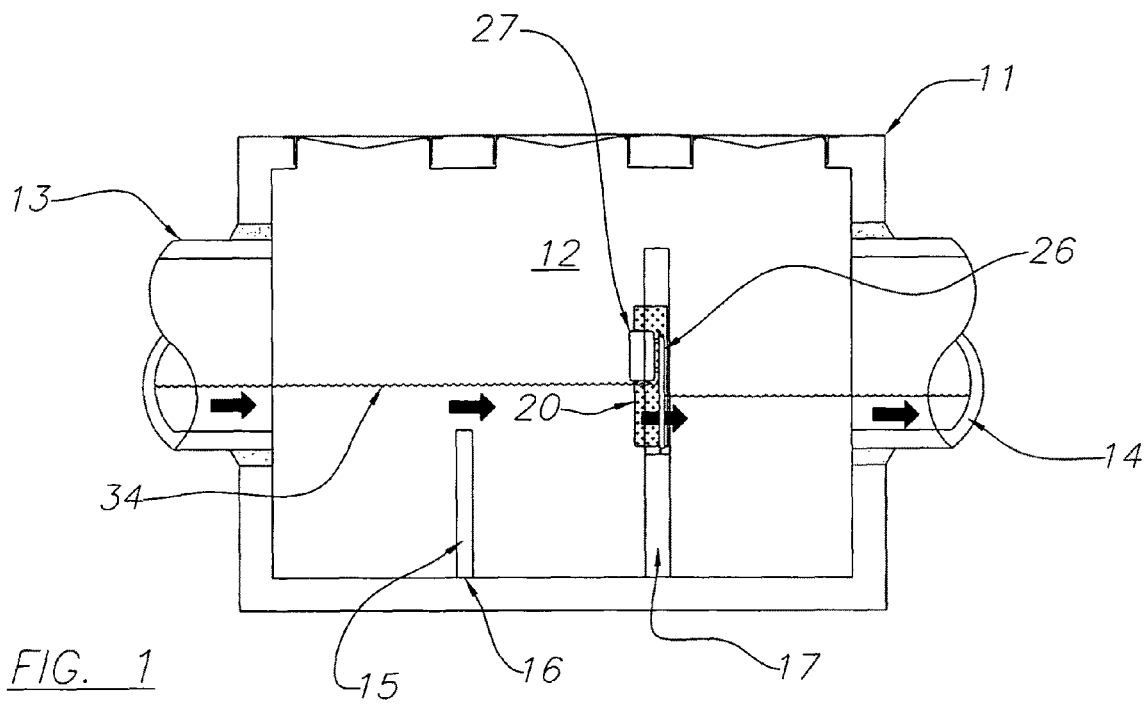
FIG. 1 is a sectional view of a storm water vault having the filter and floatable baffle panel in a rest position mounted therein.

Referring to the drawings, FIGS. 1 through 7, and especially to FIGS. 1 through 5 a filtering system 10 has a vault 11 having a chamber 12 therein and an inlet 13 and an outlet 14. The vault has a baffle 15 extending from the base 16 thereof. A filtering and baffle wall 17 is mounted in the vault 11 chamber 12.

The wall 17 has a filter opening 18 therethrough sized for a filter element 20. The filter element 20 is removably mounted in the opening 18 with side edges 21 sliding in channel tracks 22. A bottom channel 23 receives a bottom edge 23 of the filter 20 to seal the filter into the opening 18. The filter element 20 has a gripping member 24 for gripping the filter 20 during removal and replacement of filters.

Figure 2:
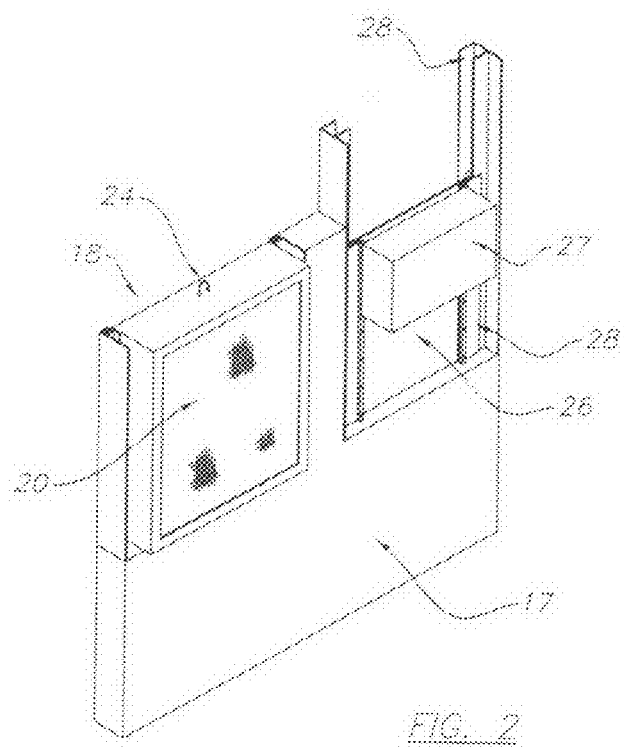
FIG. 2 is a perspective view of the filter wall of FIG. 1.

A wide variety of filter media is readily available in the market place. The selection of the desired filter media is typically determined by targeting treatment with regard to the pollutants of concern. The filter media of the present filter can have multiple filter media and may include a hydrocarbon absorption media. Also as seen in FIGS. 1 & 2, the filter element 20 is located below the vault 11 openings to provide easy access to the filter cartridge from above the vault without having to enter the vault. This satisfies strict government requirement guidelines for personnel entering confined spaces by not having to have personnel enter the vault to change the filter 20.

Figure 3:
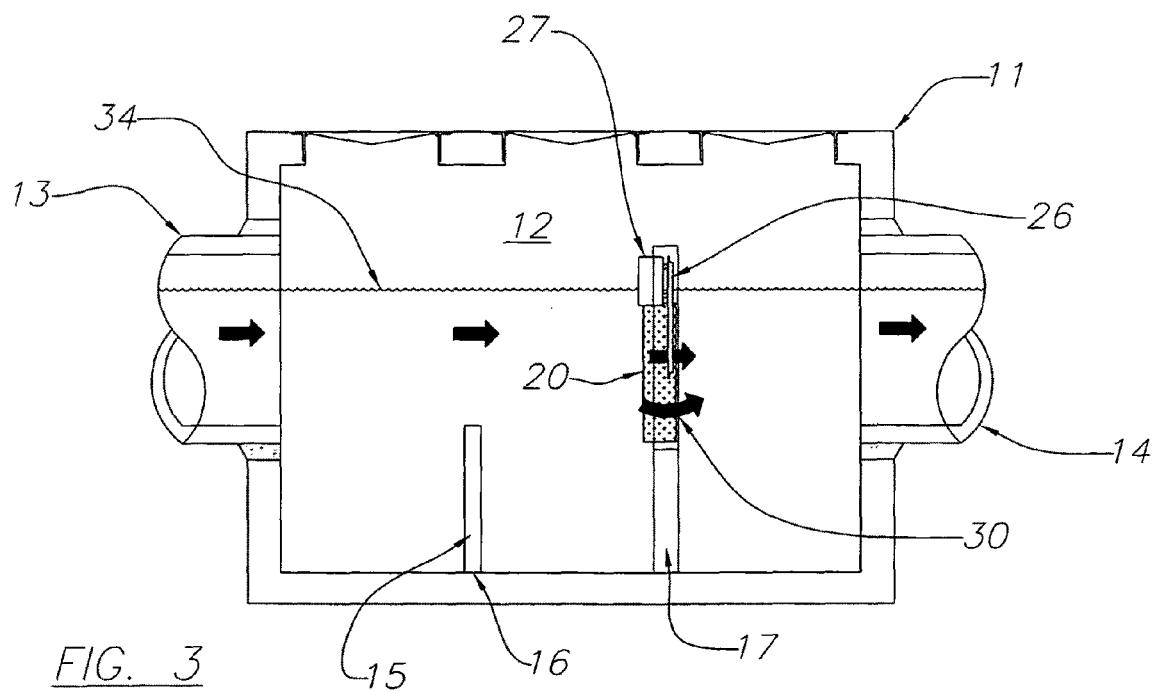
FIG. 3 is a sectional view of the vault of FIG. 1 having the floatable baffle panel in a raised position.

The wall 17 has a passageway 25 therethrough for holding a floatable baffle panel 26 therein. The baffle panel 26 has floatation 27 attached thereto on the inflow or inlet side of the vault 11. The baffle panel 26 moves up and down in a pair of tracks 28 on either side of the opening 26. The baffle panel moves from a rest position as seen in FIG. 1 when there is a low flow of water through the vault 11 to a raised position as shown in FIG. 3 when there is a high flow of water into the vault 11 thereby lifting the baffle panel with the floatation 27. When the baffle panel 26 is in a raised position as in FIGS. 3 and 4, a passageway 30 is opened beneath the baffle panel 26 for the flow of storm water thereunder unimpeded to thereby prevent storm water from accumulating on the inlet side of the wall 17.

Figure 6:
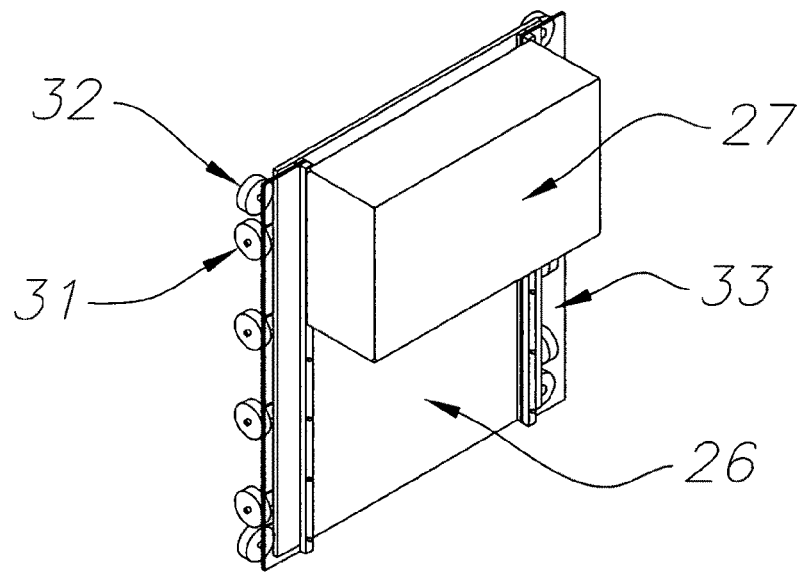
FIG. 6 is a perspective view of the floating baffle panel inflow side.
Figure 7:
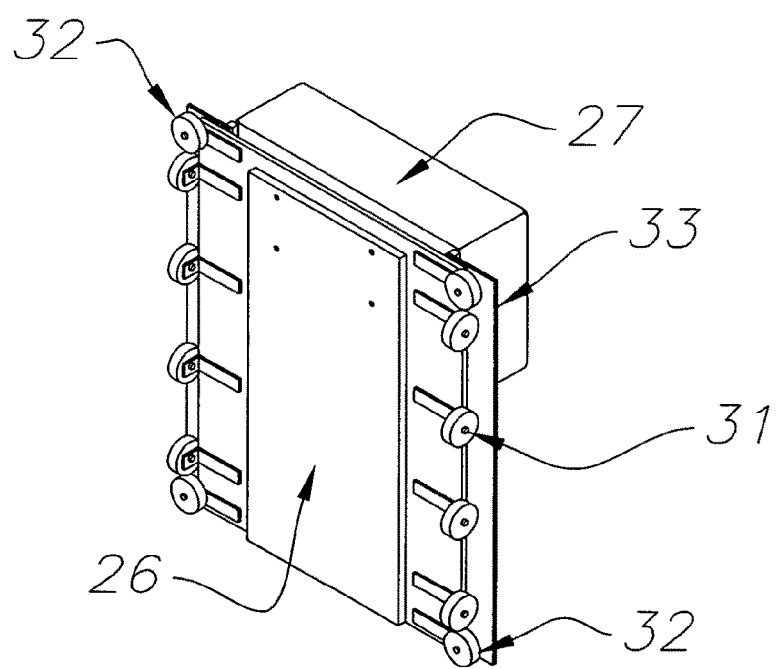
FIG. 7 is a perspective view of the floating baffle panel outflow side.

Referring to FIGS. 6 and 7 a more complete view of the baffle panel 26 is seen having the floatation 27 attached thereto on the inflow side of FIG. 6. The baffle panel 26 has a plurality of load rollers 31 and a plurality of alignment rollers 32 on each side thereof. The rollers 31 and 32 fit within the tracks 28 on either side of the opening in the wall 17. The baffle panel 26 also has seals 33 attached thereto on one side of the rollers 31 and 32 which seals ride on the side of the channel tracks 28 to better seal the opening against the passage of storm water therearound in low flow conditions to assure that the water goes through the filter 20.

Figure 4:
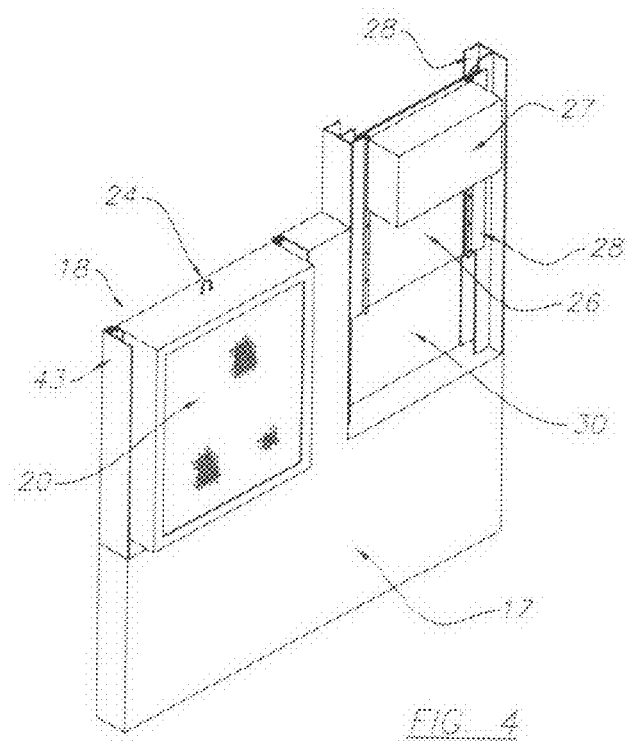
FIG. 4 is a perspective view of the filter wall of FIG. 3.
Figure 5:
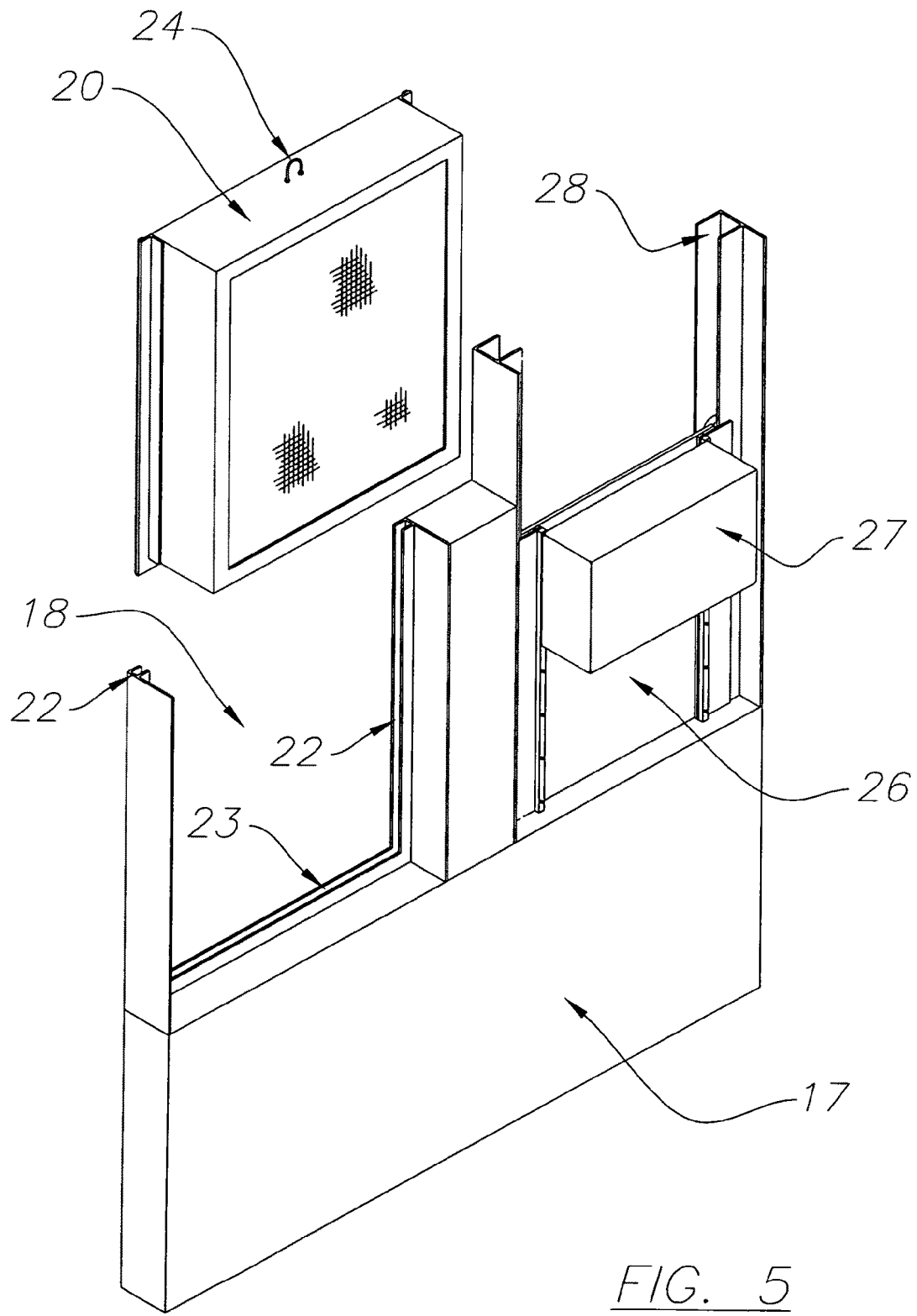
FIG. 5 is an exploded perspective view of the filter wall of FIGS. 1 through 4.

The operation of filter system can be seen in connection with FIGS. 1 through 4 in which the vault 11 has a normal or low flow condition illustrated in FIGS. 1 and 2 and under a high flow condition in FIGS. 3 and 4. In FIGS. 1 and 2 the baffle panel 26 is in a rest position closing off the passageway 30 therebeneath and all the storm water is passing through the filter 20 as it passes the wall 17 from the inlet 13 to the outlet 14. In FIGS. 3 and 4, a high flow of storm water is illustrated and the baffle panel 26 has been raised or floated in the water 33 to block floating debris from flowing thereover and to open the passageway 30 for the passage of storm water to prevent the storm water from backing up in the vault 11 and inlet pipe 13.

It should be clear at this point that during small to medium rain events the storm water entering the vault 11 chamber 12 will pass through the filter element 20. As the water rises, the baffle panel rises to provide an unimpeded flow therebeneath to prevent a backup of the water while still blocking floating debris from passing through the vault. Debris caught in the vault is consumed by micro-organisms between rain events to aid in freeing up and making available the media surface for the next rain event. However, the present invention is not to be limited to the forms shown which are to be considered illustrative rather than restrictive.

I claim:

1. A storm water filter system comprising:

a vault housing having a chamber therein having an inlet thereinto and an outlet therefrom;

a wall mounted in said housing chamber between the inlet and outlet, said wall having an filter opening therethrough;

a filter element removably mounted in said wall filter opening for filtering storm water passing therethrough;

a pair of tracks attached to said wall and defining a passageway through said wall;

a floating baffle panel having a top and a bottom and a pair of sides and being movably mounted in said pair of tracks and positioned to block floatable debris from passing thereover while forming a passageway thereunder and through said wall when said floating baffle panel is floated to a raised position; and at least one floatation member mounted on said floatable baffle panel to allow said baffle panel to rise and fall in said pair of tracks with the rise and fall of storm water on the inlet side of wall from a rest position to a raised position opening a passageway therebeneath as the water level rises in said vault chamber;

whereby storm water entering said inlet passes through said filter element and out said outlet and under said floating baffle panel when said floatable baffle panel is floated to a raised position to thereby prevent storm water from accumulating on the inlet side of said wall.

2. The storm water filter system of claim 1 in which said filter opening has a pair of tracks on two sides thereof for said filter to slide into and out of for filter replacement.

3. The storm water filter system of claim 2 in which said floatation member is attached to said baffle panel on the inlet side of thereof.

4. The storm water filter system of claim 3 in which said filter element has a pair of edges sized to fit into said filter opening pair of tracks.

5. The storm water filter system of claim 4 in which said filter opening has a bottom surface having a channel therein for a filter bottom edge to fit into.

6. The storm water filter system of claim 5 in which said floatable baffle panel has a pair of seals on the sides thereof aligned for sealing the floating baffle panel against said pair of tracks.

7. The storm water filter system of claim 6 in which said filter element has a lift member for engaging to lift said filter element from said wall filter opening.

8. The storm water filter system of claim 7 in which said floatable baffle panel has a plurality of rollers on each side thereof riding in each side of said pair of tracks.

9. The storm water filter system of claim 8 in which said plurality of rollers on each side of said floatable baffle panel includes a plurality of load rollers supporting said moving skimmer panel against the force of water bearing thereagainst.

10. The storm water filter system of claim 9 in which said plurality of rollers includes a pair of centering rollers on each side of said floatable baffle panel.

11. The storm water filter system of claim 10 having each said baffle panel track is a vertically extending channel holding said rollers therein.

12. The storm water filter system of claim 11 in which said filter element has hydrocarbon absorption filtering media therein.

13. The storm water filter system of claim 1 in which the vault housing has an opening directly over the filter element so that the filter element can be removed and replaced without a person entering the vault.

* * * * *